UNITED STATES PATENT OFFICE.

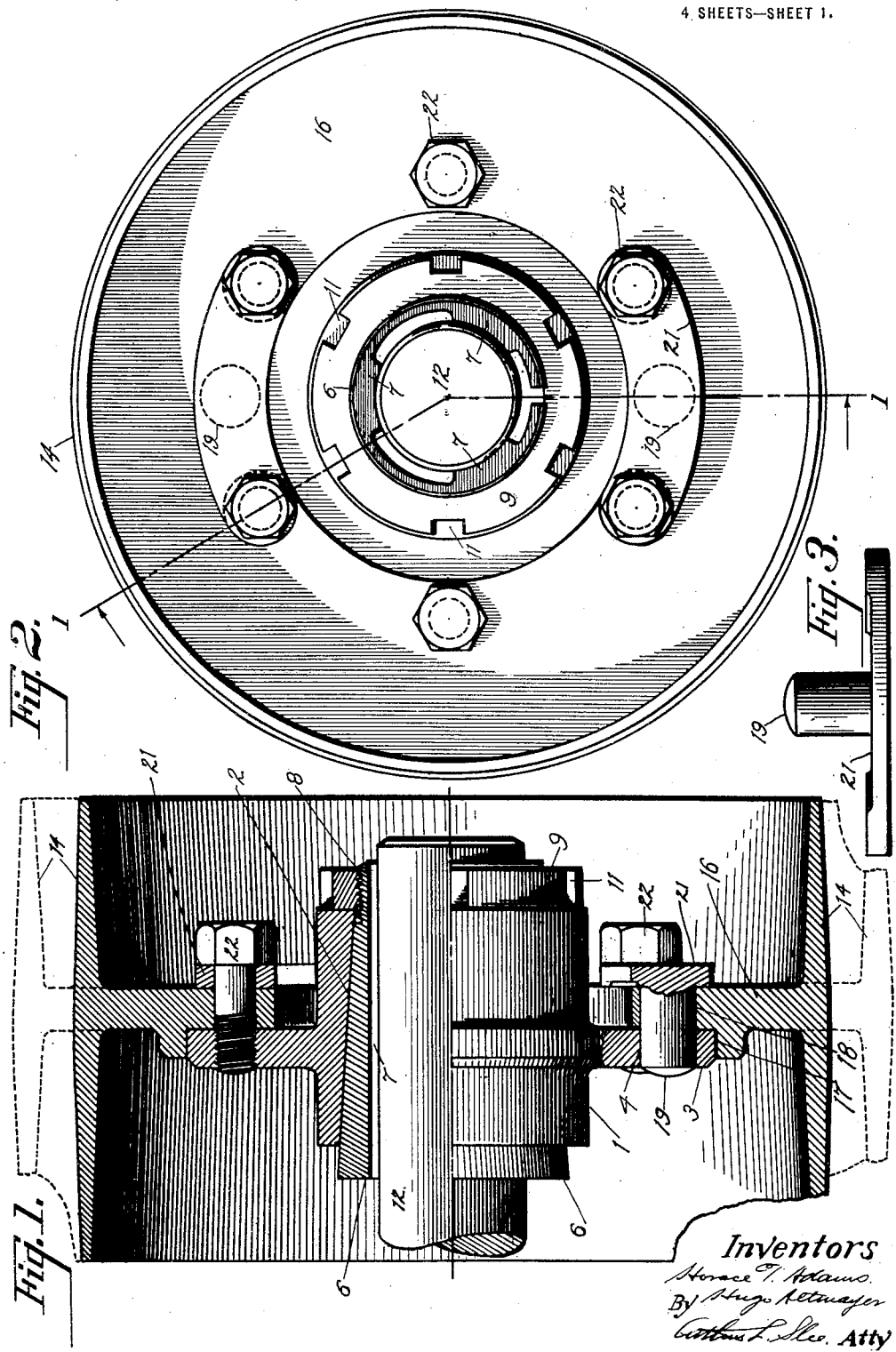

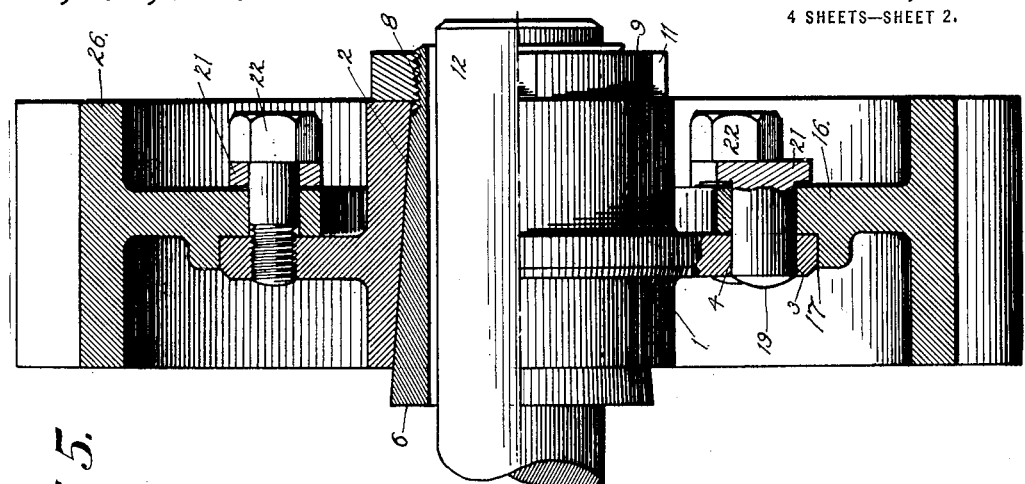
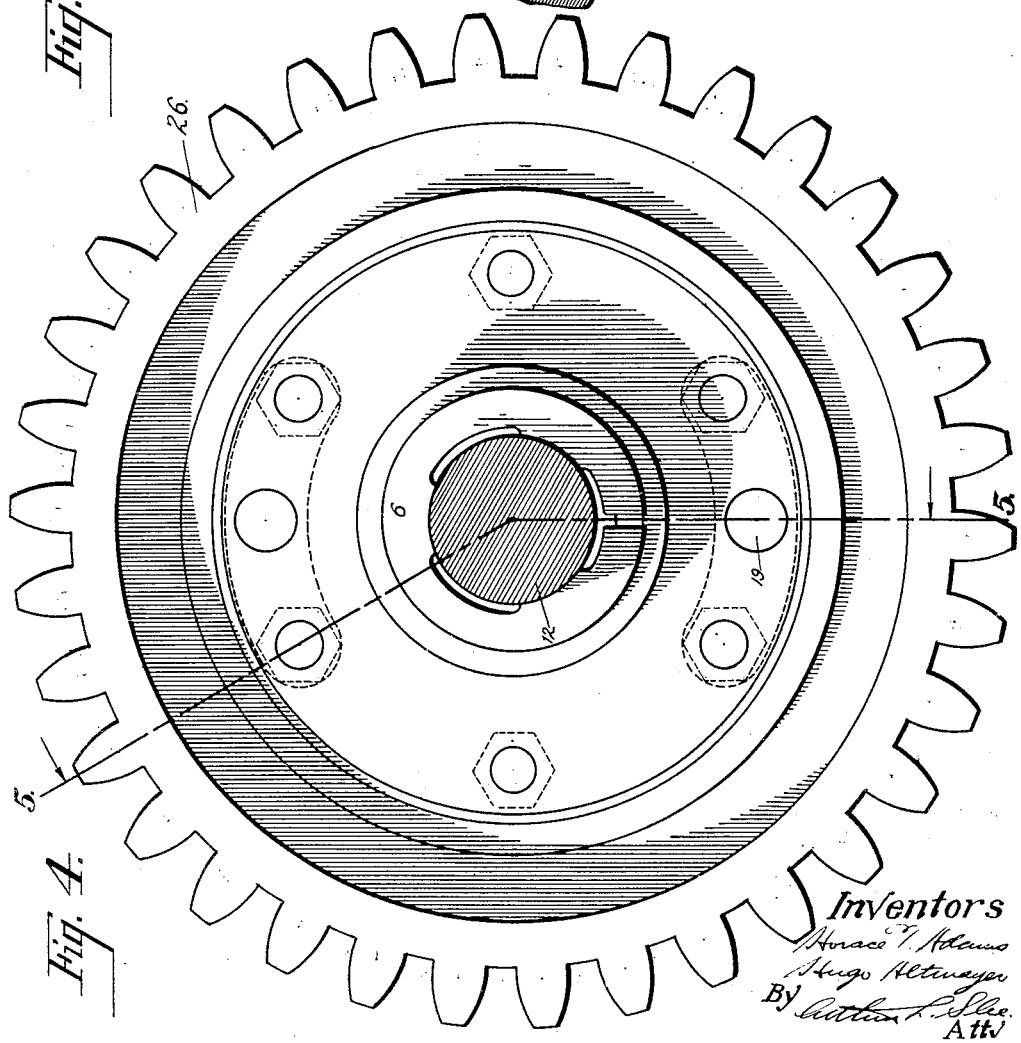

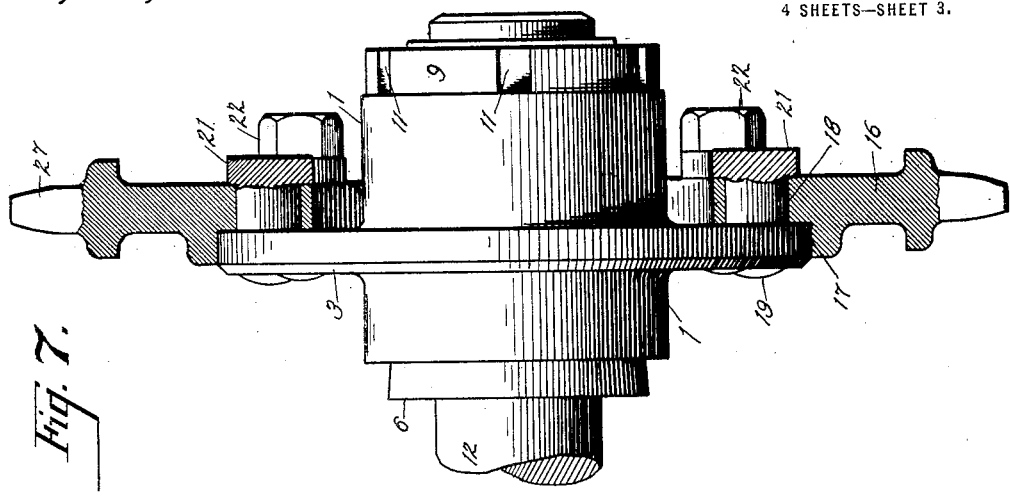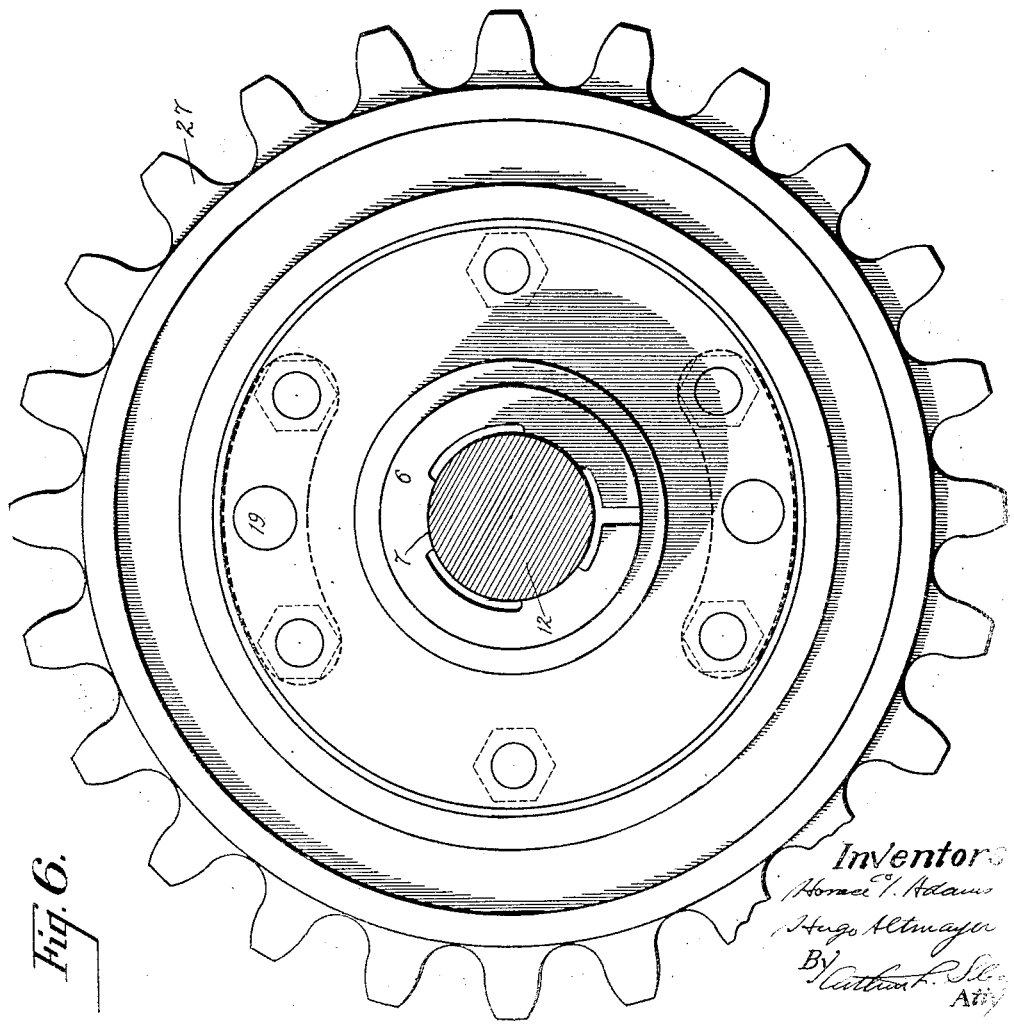

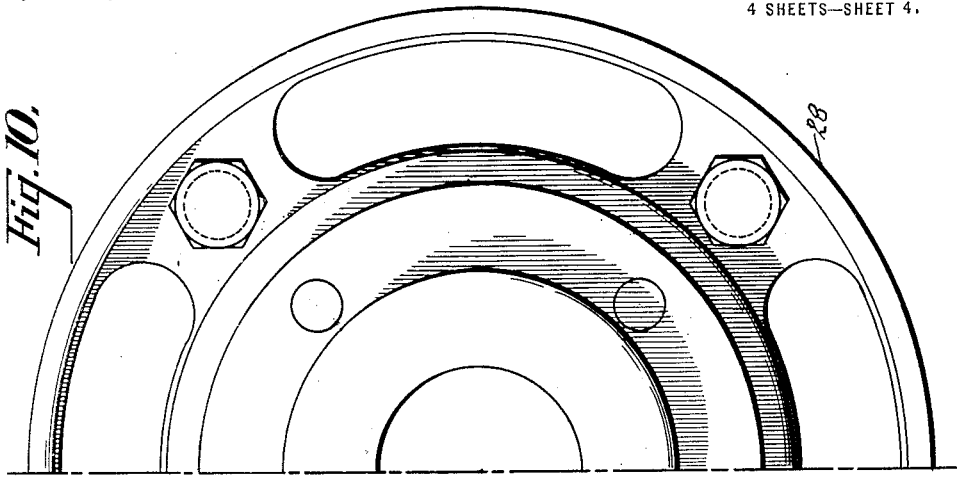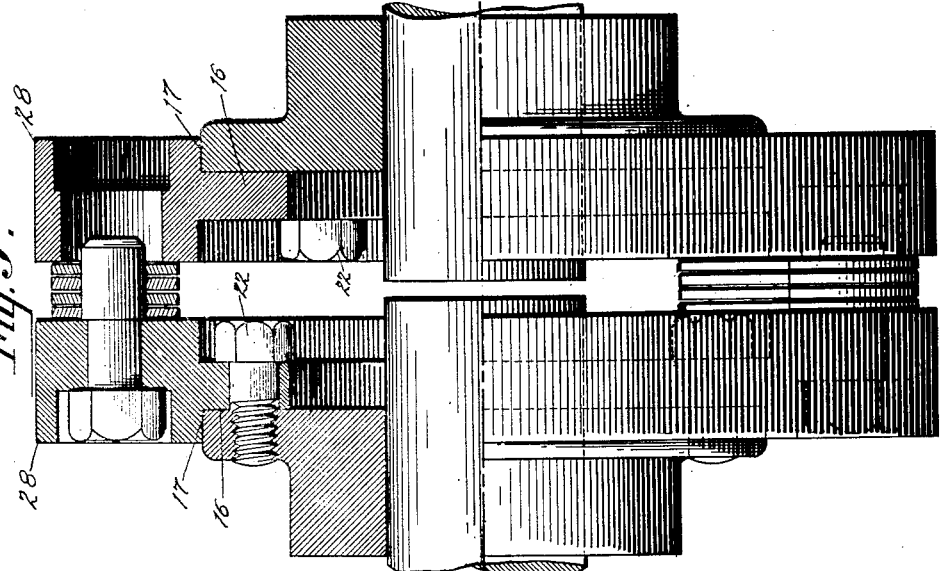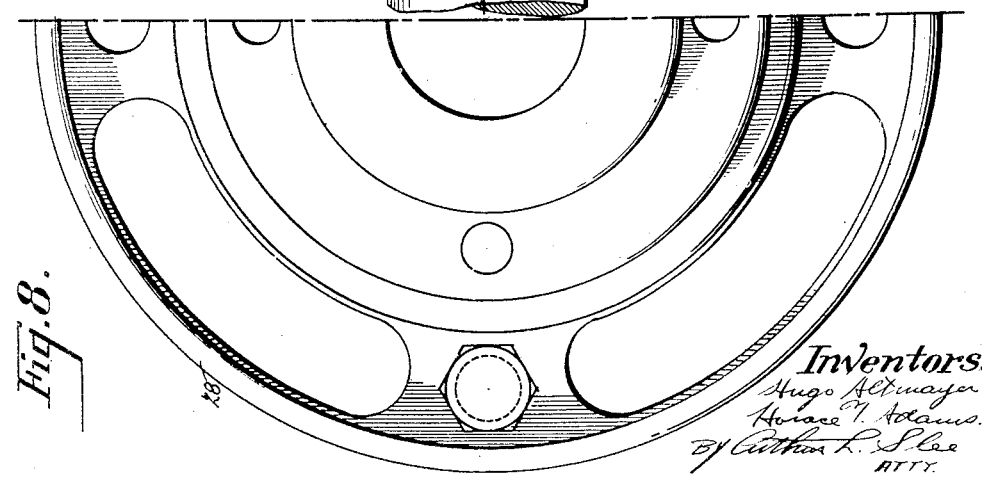

HORACE T. ADAMS AND HUGO ALTMAYER, OF SAN FRANCISCO, CALIFORNIA.

INTERCHANGEABLE WHEEL.

1,371,212.　　　Specification of Letters Patent.　　Patented Mar. 15, 1921.

Application filed September 2, 1919. Serial No. 321,249.

*To all whom it may concern:*

Be it known that we, HORACE T. ADAMS and HUGO ALTMAYER, citizens of the United States, residing in the city and county of San Francisco and State of California, have invented a certain new and useful Improvement in Interchangeable Wheels, of which the following is a specification.

Our invention relates to improvements in interchangeable wheels wherein hubs having bores of various diameters operate in conjunction with separable rims of different diameters and types whereby one hub of a given bore diameter may be readily provided or fitted with a rim of any required diameter and a rim of a given diameter may be provided with hubs having varying bore diameters whereby said rim may be readily and easily applied to any shaft regardless of the size of said shaft and the hub affixed thereto.

The primary object of the present invention is to provide an improved device of the character described whereby any one of a plurality of hubs of various diameters may be readily, easily and efficiently attached to any one of a plurality of rims of various types and diameters.

A still further object of the present invention is to provide, as an article of manufacture, a wheel or pulley having a separable rim and hub whereby hubs having various bore diameters may be interchanged with any one of a plurality of rims of various diameters and having hub engaging means of the same diameter thus providing a maximum variety of rim and bore sizes with a minimum number of parts.

A still further object of our invention is to provide an improved and simplified clamping means for securing a hub to a shaft or the like.

A still further object is to provide improved means for connecting a flange of a rim to the flange of a hub in such a manner that said connecting means will transmit rotation of one member to the other member thereby relieving connecting bolts of driving strain.

We accomplish these and other objects by means of the improved device disclosed in the drawings forming a part of the present specification wherein like characters of reference are used to designate similar parts throughout the said specification and drawings, and in which:—

Figure 1 is a broken sectional view of the improved device disclosing the manner in which a rim and hub are attached together, said view being taken on line 1—1 of Fig. 2 in the direction indicated;

Fig. 2 is a front elevation of the device;

Fig. 3 is a detailed elevation of one of the connecting clamps;

Fig. 4 is an elevation of a modified form of the invention disclosing a rim having a gear thereon attached to a hub rim;

Fig. 5 is a sectional view taken on line 5—5 of Fig. 4 in the direction indicated, three-quarters of the hub being shown in elevation;

Fig. 6 is a still further modified form disclosing a sprocket rim attached to a pulley hub;

Fig. 7 is a side elevation of the hub disclosing the sprocket rim in section;

Figs. 8, 9 and 10 are a half side elevation, front elevation partly in section, and a reverse side elevation, respectively, of a further modification of our invention as applied to a coupling.

Referring to the drawings the numeral 1 is used to designate a hub having a conical bore 2 and an annular flange 3 provided with a plurality of apertures 4. Slidably mounted within the conical bore 2 of the hub 1 is a split conical bushing 6 provided with longitudinally disposed ribs 7 and a threaded portion 8 on the smaller end thereof which is engaged by a threaded collar 9 provided with a series of recesses 11 in the periphery thereof, said recesses being adapted to be engaged by a suitable tool, not shown, to rotate said collar 9 upon the threaded portion 8 of said split bushing 6 and thereby move the hub 1 upon said split bushing 6 to clamp the same upon a shaft 12 or the like.

A rim 14 is provided with an internal annular flange 16 having an annular seat 17 formed therein to engage the periphery of the flange 2 of the hub 1 and thereby center said rim 14 with said hub 1.

The internal flange 16 of the rim 14 is also provided with a plurality of apertures 18 which register with the apertures 4 of the hub flange 3, certain of said registering apertures 4 and 18 being engaged by lugs 19 formed integral with clamps 21, which are in turn secured to one of the flanges by means of suitable bolts 22 which hold said clamps 21 and lugs 19 in operative position as disclosed in Figs. 1 and 2 of the drawings.

By means of this novel feature the driving strain or tension of the hub 1 is transmitted through the flange 3 thereof to the flange 16 of the rim 14.

The rims 14 are of various diameters but the annular seats 17 in the flanges 16 thereof are of the same diameter. Likewise the hubs 1 and split bushings 6 therein are of various diameter while the peripheries of the hub flanges 3 are of the same diameter so that various sizes of rims may be applied to the same hub where it is desired to change the size of the pulley on a given shaft. Similarly, by means of this novel feature, where the size of the rim is not to be changed in transferring the same to a differently sized shaft the hub may be replaced by a hub having the required bore for the shaft to be employed.

It is obvious that the pulley may be released entirely from or moved longitudinally upon a shaft by the simple expedient of rotating the collar 9 to permit disengagement of the conical bore 2 of the hub 1 from the split conical bushing 6 which will release said bushing 6 from engagement with the shaft 12.

By rotating the collar 9 to move the hub 1 upon the split bushing 6 said bushing is contracted to move the inner surfaces of the longitudinal ribs 7 thereon into rigid engagement with the surface of the shaft 12, thereby eliminating the use of keys and the like.

In Figs. 4 and 5 of the drawings we have disclosed a gear ring 26 provided with an internal annular flange 16 having an annular seat 17 to engage the periphery of the hub flange 3 whereby a rim 14 may be replaced by a gear 26 of the same or a different diameter. The gear 26 is applied and secured to the hub flange 3 in the same manner as the rim 14.

In Figs. 6 and 7 of the drawings we have disclosed a sprocket 27 likewise provided with an internal annular flange 16 and annular seat 17 to engage the hub flange 3.

In Figs. 8, 9 and 10, of the drawings we have disclosed a modified form wherein the detachable rim feature is used to apply the collars 28 of a flexible coupling, said collars 28 being also provided with internal flanges 16 having annular seats 17 to engage the hub flanges 3.

From the foregoing it is obvious that we have provided an improved detachable wheel wherein the rims and hubs are interchangeable thus providing an improved means for supplying a greater variety of rim and hub sizes with a minimum number of parts, said rims embracing gears, sprockets, pulleys and couplings.

Having thus described our invention what we claim as new and desire to secure by Letters Patent is:

1. A detachable wheel comprising a hub having an annular flange provided with a plurality of apertures in said flange; a rim having an internal annular flange provided with a plurality of apertures arranged to register with the apertures in the hub flange; one or more clamps having lugs formed integral therewith to engage certain of the registering apertures; and means for securing the clamps to one of the flanges.

2. A detachable wheel comprising a hub having an annular flange provided with a plurality of apertures; a rim having an internal annular flange provided with an annular seat to engage the periphery of the hub flange to center said rim on said hub; and likewise provided with a plurality of apertures registering with the apertures in the hub flange; and a plurality of clamps secured to one of the flanges and provided with lugs engaging certain of the registering apertures to transmit rotation of the hub to the rim.

3. A detachable wheel comprising a hub having a conical bore and an annular apertured flange; a split conical bushing mounted within the conical bore; means for moving the hub on the bushing to clamp the same onto a shaft or the like; a rim having an apertured internal flange provided with an annular seat to engage the periphery of the hub flange and thereby center said rim on said hub; and a plurality of clamps having lugs thereon to engage and register the apertures in the hub and rim flanges to secure said rim to said hub.

4. A detachable wheel comprising a hub having a conical bore and annular apertured flange; a split conical bushing mounted within the conical bore; means for moving the hub on the bushing to clamp the same onto a shaft or the like; a rim having an apertured internal flange provided with an annular seat to engage the periphery of the hub flange and thereby center said rim on said hub; a plurality of clamps having lugs thereon to engage and register the apertures in the hub and rim flanges to secure said rim to said hub; and means for securing the flanges together.

5. In a detachable wheel, the combination with a pulley of a hub having a conical bore therein; a split conical bushing having longitudinal ribs in the bore thereof and a threaded portion at the smaller end of said bushing; and means for engaging the theaded portion of the bushing to move the hub onto said bushing and thereby clamp said bushing onto a shaft or the like.

6. A detachable wheel comprising a hub having an apertured flange; a rim having an internal apertured flange provided with a seat to engage the periphery of the hub flange and thereby center the rim on the hub; and a plurality of clamps secured to one of the flanges and having lugs formed integral therewith to register certain apertures in the flanges and to transmit rotation of the hub to the rim.

In witness whereof we hereunto set our signatures.

HORACE T. ADAMS.
HUGO ALTMAYER.